(12) United States Patent
Evron et al.

(10) Patent No.: US 7,373,414 B2
(45) Date of Patent: May 13, 2008

(54) MULTI-MEDIA SYSTEM AND METHOD FOR SIMULTANEOUSLY DELIVERING MULTI-MEDIA DATA TO MULTIPLE DESTINATIONS

(75) Inventors: Roni Evron, Tenafly, NJ (US); Benjamin Rosner, Eastchester, NY (US); Jonas Buzzerio, Bergenfield, NJ (US)

(73) Assignee: AMX LLC, Richardson, TX (US)

( * ) Notice: Subject to any disclaimer, the term of this patent is extended or adjusted under 35 U.S.C. 154(b) by 696 days.

(21) Appl. No.: 10/232,547

(22) Filed: Aug. 29, 2002

(65) Prior Publication Data

US 2004/0044742 A1 Mar. 4, 2004

(51) Int. Cl.
| | |
|---|---|
| *G06F 15/16* | (2006.01) |
| *G06F 9/44* | (2006.01) |
| *G06F 9/46* | (2006.01) |
| *H04N 7/20* | (2006.01) |
| *H04N 7/12* | (2006.01) |
| *H04N 7/16* | (2006.01) |
| *H04N 11/04* | (2006.01) |
| *G06F 3/00* | (2006.01) |
| *G06F 13/00* | (2006.01) |
| *G06F 13/14* | (2006.01) |
| *G06F 13/20* | (2006.01) |
| *H04N 7/18* | (2006.01) |
| *H04N 7/173* | (2006.01) |
| *H04N 11/02* | (2006.01) |
| *G09G 5/00* | (2006.01) |

(52) U.S. Cl. ............... 709/231; 709/246; 709/253; 725/71; 725/80; 725/127; 725/149; 719/323; 710/313; 345/502; 345/520; 345/1.3; 345/5; 348/388.1

(58) Field of Classification Search .............. 709/231, 709/246, 253; 725/43, 71, 78, 80, 127, 141, 725/149, 153; 719/323; 710/313; 345/502, 345/520, 1.3, 5; 348/52, 388.1; 370/319
See application file for complete search history.

(56) References Cited

U.S. PATENT DOCUMENTS

| | | | | | |
|---|---|---|---|---|---|
| 4,706,117 | A | * | 11/1987 | Schoolman | ............... 348/53 |
| 4,914,527 | A | * | 4/1990 | Asai et al. | ............... 386/75 |
| 5,130,794 | A | * | 7/1992 | Ritchey | ............... 348/39 |
| RE34,611 | E | * | 5/1994 | Fenwick et al. | ............... 725/93 |
| 5,339,413 | A | * | 8/1994 | Koval et al. | ............... 719/314 |

(Continued)

FOREIGN PATENT DOCUMENTS

WO WO 02/057939 7/2002

OTHER PUBLICATIONS

Ong, L. and Yoakum, J. "An Introduction to the Stream Control Transmission Protocol (SCTP)," RFC 3286, May 2002, pp. 1-10.*

(Continued)

*Primary Examiner*—Jason D Cardone
*Assistant Examiner*—Melvin H Pollack
(74) *Attorney, Agent, or Firm*—Gardere Wynne Sewell, LLP

(57) ABSTRACT

A multimedia system and method that provides easy universal text searching for non-technical users, is disclosed. A configuration of the multimedia system and method of the present invention also facilitates content delivery through multiple, independent, simultaneous feeds from a single source to two or more different destinations without impairing audio and/or video and/or data stream quality.

13 Claims, 6 Drawing Sheets

U.S. PATENT DOCUMENTS

| | | | |
|---|---|---|---|
| 5,455,619 A * | 10/1995 | Truckenmiller et al. | 725/14 |
| 5,487,167 A * | 1/1996 | Dinallo et al. | 715/500.1 |
| 5,533,021 A * | 7/1996 | Branstad et al. | 370/396 |
| 5,652,749 A * | 7/1997 | Davenport et al. | 370/466 |
| 5,721,878 A * | 2/1998 | Ottesen et al. | 725/87 |
| 5,818,512 A * | 10/1998 | Fuller | 725/82 |
| 5,832,218 A | 11/1998 | Gibbs et al. | 295/200.33 |
| 6,104,414 A * | 8/2000 | Odryna et al. | 345/536 |
| 6,160,544 A * | 12/2000 | Hayashi et al. | 715/716 |
| 6,232,932 B1 * | 5/2001 | Thorner | 345/1.3 |
| 6,415,328 B1 * | 7/2002 | Korst | 709/232 |
| 6,421,717 B1 | 7/2002 | Kloba et al. | 709/219 |
| 6,446,130 B1 * | 9/2002 | Grapes | 709/231 |
| 6,493,758 B1 | 12/2002 | McLain | 709/227 |
| 6,501,511 B2 * | 12/2002 | Sekimoto et al. | 348/553 |
| 6,507,867 B1 | 1/2003 | Holland et al. | 709/219 |
| 6,650,963 B2 * | 11/2003 | DiLorenzo | 700/234 |
| 6,683,911 B1 * | 1/2004 | Inoue | 375/240.26 |
| 6,697,376 B1 * | 2/2004 | Son et al. | 370/465 |
| 6,732,183 B1 * | 5/2004 | Graham | 709/231 |
| 6,744,771 B1 * | 6/2004 | Barber et al. | 370/400 |
| 6,775,654 B1 * | 8/2004 | Yokoyama et al. | 704/500 |
| 6,801,529 B1 * | 10/2004 | McGrane et al. | 370/390 |
| 6,826,185 B1 * | 11/2004 | Montanaro et al. | 370/395.1 |
| 6,829,368 B2 * | 12/2004 | Meyer et al. | 382/100 |
| 6,865,596 B1 * | 3/2005 | Barber et al. | 709/208 |
| 6,868,403 B1 * | 3/2005 | Wiser et al. | 705/51 |
| 6,870,518 B1 * | 3/2005 | Brenner | 345/1.3 |
| 6,870,861 B1 * | 3/2005 | Negishi et al. | 370/537 |
| 6,903,706 B1 * | 6/2005 | Trottier et al. | 345/1.1 |
| 6,937,766 B1 * | 8/2005 | Wilf et al. | 382/229 |
| 6,985,966 B1 * | 1/2006 | Gupta et al. | 709/248 |
| 7,020,709 B1 * | 3/2006 | Sloss | 709/231 |
| 7,038,699 B2 * | 5/2006 | Sato et al. | 345/633 |
| 7,075,994 B2 * | 7/2006 | Ihara | 375/240.28 |
| 7,076,153 B2 * | 7/2006 | Ando et al. | 386/95 |
| 7,103,668 B1 * | 9/2006 | Corley et al. | 709/231 |
| 7,130,908 B1 * | 10/2006 | Pecus et al. | 709/226 |
| 2002/0013948 A1 * | 1/2002 | Aguayo et al. | 725/91 |
| 2002/0052781 A1 | 5/2002 | Aufricht et al. | 705/14 |
| 2002/0073076 A1 | 6/2002 | Xu et al. | 707/3 |
| 2002/0073238 A1 * | 6/2002 | Doron | 709/246 |
| 2002/0083145 A1 | 6/2002 | Perinpanathan | 709/213 |
| 2002/0083474 A1 * | 6/2002 | Hennenhoefer et al. | 725/143 |
| 2002/0129094 A1 | 9/2002 | Reisman | 709/203 |
| 2002/0161826 A1 | 10/2002 | Arteaga et al. | 709/203 |
| 2002/0176601 A1 * | 11/2002 | Rhoads | 382/100 |
| 2003/0023657 A1 | 1/2003 | Fischer et al. | 709/102 |
| 2003/0035556 A1 * | 2/2003 | Curtis et al. | 381/105 |
| 2003/0037261 A1 | 2/2003 | Meffert et al. | 713/201 |
| 2003/0048299 A1 | 3/2003 | Stern | 345/760 |
| 2003/0084179 A1 * | 5/2003 | Kime et al. | 709/231 |
| 2003/0101458 A1 * | 5/2003 | Jacobson | 725/78 |
| 2003/0149574 A1 * | 8/2003 | Rudman | 705/1 |
| 2003/0191850 A1 * | 10/2003 | Thornton | 709/231 |
| 2003/0227906 A1 * | 12/2003 | Hallman | 370/352 |
| 2003/0236904 A1 * | 12/2003 | Walpole et al. | 709/231 |
| 2004/0034864 A1 * | 2/2004 | Barrett et al. | 725/38 |
| 2006/0053462 A1 * | 3/2006 | Albag et al. | 725/126 |

OTHER PUBLICATIONS

Stewart, R. et al. "Stream Control Transmission Protocol," RFC 2960, Oct. 2000, pp. 1-134.*

Croker, S. "Proposal for a Network Standard Format for a Data Stream to Control Graphics Display," RFC 86, Jan. 5, 1971, pp. 1-6.*

Perkins, C. and Hodson, O. "Options for Repair of Streaming Media," RFC 2354, Jun. 1998, pp. 1-12.*

Kikuchi, Y. et al. "RTP Payload Format for MPEG-4 Audio/Visual Streams," RFC 3016, Nov. 2000, pp. 1-21.*

Stewart, R. and Metz, C. "SCTP: New Transport Protocol for TCP/IP," IEEE Internet Computing, vol. 5, Issue 6, Nov./Dec. 2001, pp. 64-69.*

Lee, Kang-Won et al. "An Integrated Source Coding and Congestion Control Framework for Video Streaming in the Internet," IEEE INFOCOM, 2000, pp. 1-10.*

Cen, Shanwei et al. "Flow and Congestion Control for Internet Media Streaming Applications," Proceedings of Multimedia Computing and Networking, 1998, pp. 1-14.*

Gemmell, D.J. et al. "Multimedia Storage Servers: A Tutorial," Computer, vol. 28, Issue 5, May 1995, pp. 40-49.*

Goldstein, Seth Copen, et al. "PipeRench: A Co-Processor for Streaming Multimedia Acceleration," Proceedings of the 26th Annual International Symposium on Computer Architecture, 1999, pp. 28-39.*

Rejaie, R. et al. "Multimedia Proxy Caching Mechanism for Quality Adaptive Streaming Applications in the Internet," IEEE 19th Annual Joint Conference of the IEEE Computer and Communications Societies, vol. 2, Mar. 2000, pp. 980-989.*

M. Bickley, et al., *Using Servers to Enhance Control System Capability*, Proceedings of the 1999 Particle Accelerator Conference (IEEE 1999).

Fohler, et al., *SALSART—A Web Based Cooperative Environment for Offline Real-time Schedule Design*, Proceedings of the 10th Euromicro Workshop on Parallel, Distributed and Network-based Processing (IEEE Computer Society 2002).

Giguere, *Mobile Data Management: Challenges of Wireless and Offline Data Access* (IEEE 2001).

* cited by examiner

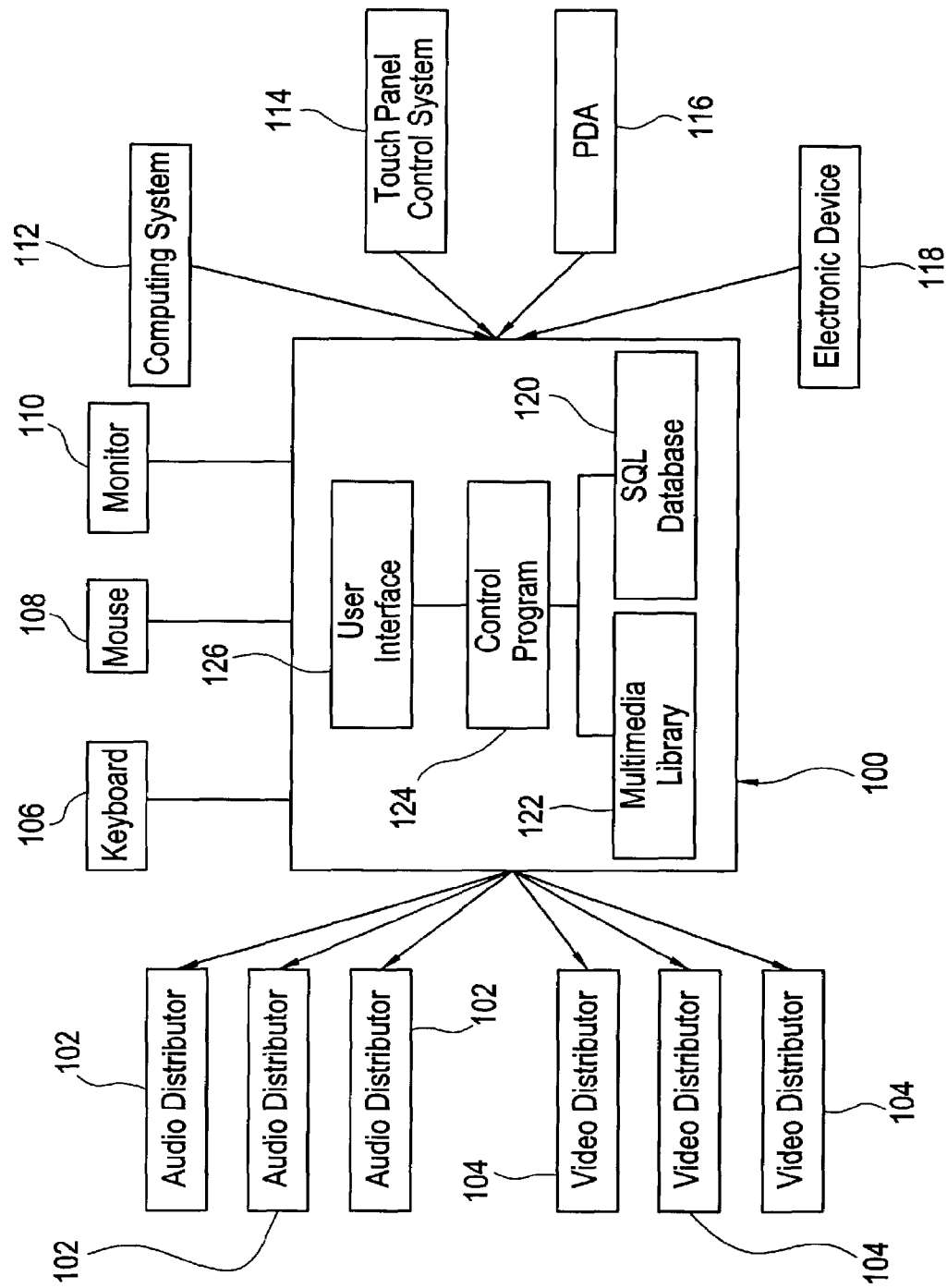

FIG. 2A

| Field | Type | Null | Key | Default |
|---|---|---|---|---|
| cdId | int (11) | | PRI | 0 |
| Title | varchar (255) | | MUL | |
| Artist | varchar (75) | | | |
| Genre | varchar (30) | | | |

FIG. 2B

| Field | Type | Null | Key | Default |
|---|---|---|---|---|
| cdId | int (11) | | MUL | 0 |
| TrackNum | int (11) | | | 0 |
| Name | varchar (150) | | MUL | |
| Length | varchar (5) | | | |
| Format | char (3) | YES | | NULL |

FIG. 2C

| Field | Type | Null | Key | Default |
|---|---|---|---|---|
| dvdId | int (11) | | | |
| Title | varchar (255) | | | |
| Keywords | varchar (255) | | | |

FIG. 3A

Search For: [                    ]

| | Title | Song | Artist | Genre | Artist | Title | Genre |
|---|---|---|---|---|---|---|---|
| 1 | ☑ | ☑ | ☑ | ☑ | A Tribe Called Quest | The Low End Theory | Rap |
| 2 | ☑ | ☑ | ☑ | ☑ | Academy Of St. | Mozart - Piano Concertos | Classical |
| 3 | ☑ | ☑ | ☑ | ☑ | ACDC | Back In Black | Rock |
| 4 | ☑ | ☑ | ☑ | ☑ | Alicia Keys | songs in A minor | R&B |
| 5 | ☑ | ☑ | ☑ | ☑ | Andres Segovia | A Centenary Celebration (Disc 4) | Classical |
| 6 | ☑ | ☑ | ☑ | ☑ | Anita baker | Rapture | Rock |
| 7 | ☑ | ☑ | ☑ | ☑ | Antonio Vivaldi | The Best of Vivaldi | Classical |
| 8 | ☑ | ☑ | ☑ | ☑ | Antonio Vivaldi: Le Quattro | Antonio Vivaldi: Le Quattro | Classical |
| 9 | ☑ | ☑ | ☑ | ☑ | Beatles | One | Rock |
| 10 | ☑ | ☑ | ☑ | ☑ | Beau Jocque | Gonna Take You Downtown | Xydeco |
| 11 | ☑ | ☑ | ☑ | ☑ | Ben Folds Five | Naked Baby Pictures | Rock |

FIG. 3B

Search For: [b]

| | Title | Song | Artist | Genre | Artist | Title | Genre |
|---|---|---|---|---|---|---|---|
| 9 | ☐ | ☑ | ☑ | ☐ | Beatles | One | Rock |
| 10 | ☐ | ☑ | ☑ | ☐ | Beau Jocque | Gonna Take You Downtown | Xydeco |
| 11 | ☑ | ☑ | ☑ | ☐ | Ben Folds Five | Naked Baby Pictures | Rock |
| 12 | ☑ | ☑ | ☑ | ☑ | Bernard Allison | Keepin' THe Blues Alive | Blues |
| 13 | ☐ | ☑ | ☑ | ☐ | Bernard Allison Group | Hang On! | Rock |
| 14 | ☐ | ☑ | ☑ | ☐ | Bill Frisell | Gone, Just Like A Train | Jazz |
| 15 | ☐ | ☑ | ☑ | ☑ | Bill Wymann & The Rhythm Kings | Struttin' Our Stuff | Blues |
| 16 | ☐ | ☑ | ☑ | ☐ | Billy Joel | Greatest Hits | Rock |
| 17 | ☐ | ☑ | ☑ | ☐ | Billy Joel | River Of Dreams | Rock |
| 18 | ☐ | ☐ | ☑ | ☐ | Billy Joel | Storm Front | Rock |
| 19 | ☐ | ☑ | ☑ | ☐ | Billy Joel | The Stranger | Rock |

FIG. 3C

Search For: [be]

| | Title | Song | Artist | Genre | Artist | Title | Genre |
|---|---|---|---|---|---|---|---|
| 9 | ☐ | ☑ | ☑ | ☐ | Beatles | One | Rock |
| 10 | ☐ | ☑ | ☑ | ☐ | Beau Jocque | Gonna Take You Downtown | Xydeco |
| 11 | ☐ | ☐ | ☑ | ☐ | Ben Folds Five | Naked Baby Pictures | Rock |
| 12 | ☐ | ☑ | ☑ | ☐ | Bernard Allison | Keepin' THe Blues Alive | Blues |
| 13 | ☐ | ☑ | ☑ | ☐ | Bernard Allison Group | Hang On! | Rock |
| 20 | ☐ | ☐ | ☑ | ☐ | Joe Beard | For Real | Blues |
| 21 | ☐ | ☑ | ☑ | ☐ | The Beatles | Past Masters Volume Two | Rock |
| 22 | ☑ | ☑ | ☑ | ☐ | The Beatles | With The Beatles | Rock |
| 1 | ☐ | ☑ | ☑ | ☐ | A Tribe Called Quest | The Low End Theory | Rap |
| 23 | ☐ | ☐ | ☑ | ☐ | Carey Bell | Deep Down | Blues |
| 24 | ☐ | ☑ | ☑ | ☐ | The Cranberries | To The Faithful Departed | Rock |

FIG. 3D

Search For: [bea]

| | Title | Song | Artist | Genre | Artist | Title | Genre |
|---|---|---|---|---|---|---|---|
| 9 | ☐ | ☐ | ☑ | ☐ | Beatles | One | Rock |
| 10 | ☐ | ☑ | ☑ | ☐ | Beau Jocque | Gonna Take You Downtown | Xydeco |
| 20 | ☐ | ☐ | ☑ | ☐ | Joe Beard | For Real | Blues |
| 21 | ☐ | ☑ | ☑ | ☐ | The Beatles | Past Masters Volume Two | Rock |
| 22 | ☑ | ☐ | ☑ | ☐ | The Beatles | With The Beatles | Rock |
| 25 | ☐ | ☑ | ☐ | ☐ | Bruce Springsteen | Lucky Town | Rock |
| 26 | ☐ | ☑ | ☐ | ☐ | INXS | Welcome To Wherever You Are | Rock |
| 27 | ☐ | ☑ | ☐ | ☐ | John Lennon | The John Lennon Collection | Rock |
| 28 | ☐ | ☑ | ☐ | ☐ | Nirvana | Unplugged In New York | Rock |
| 29 | ☐ | ☑ | ☐ | ☐ | Patsy Cline | Sweet Dreams | Country |
| 30 | ☐ | ☑ | ☐ | ☐ | The Cars | Greatest Hits | Rock |

MULTI-MEDIA SYSTEM AND METHOD FOR SIMULTANEOUSLY DELIVERING MULTI-MEDIA DATA TO MULTIPLE DESTINATIONS

FIELD OF INVENTION

The present invention generally relates to the manipulation of multimedia content. More particularly, the present invention relates in part to a searching capability and the simultaneous transmission of multiple streams of data, such as audio data and/or video data and/or a data stream, including data stored on a media, such as a compact disc (CD) and/or digital versatile disc (DVD), to different locations.

BACKGROUND OF INVENTION

A variety of laser-readable discs are played in conventional single-disc or multiple-disc loading trays in an office, home or university environment. Examples of laser-readable discs generally include a compact disc (CD), CD-ROM, digital versatile disc (DVD), DVD-Audio, DVD-Video, DVD-ROM, and the like.

The technology that allowed multiple-disc loading is a carousel mechanism capable of holding several CDs or DVDs, for example. However, a major shortcoming of the carousel mechanism required only one disc to be played at a time. In addition, the mechanical switching from one disc to another was slow.

These shortcomings were solved by storing the contents of the discs onto a computer hard drive in order to allow more flexible access to the contents and to facilitate faster disc selection. However, applications of the hard drive technology were not without its accompanying drawbacks.

In one application, for instance, an MPEG compression scheme is employed to reduce the size of the data files stored on hard drives for faster music selection, for example. However, this compression scheme results in an audible reduction in sound quality. Moreover, this application has no DVD capability.

In another application where an MPEG compression scheme is not employed, in order to improve poor sound quality, flexible access to the contents on the hard drive became problematic because of searching capability drawbacks. Here again, this application is not capable of handling DVDs.

Accordingly, there is an increasing need to be able to provide students, faculty, staff, professionals and any variety of users, with a multi-media system that allows, in part, content delivery via multiple, simultaneous, independent feeds from a single source without impairment of audio/video quality.

SUMMARY OF INVENTION

The present invention satisfies, to a great extent, the foregoing and other needs not currently satisfied by existing technologies, while eliminating the problems with one or more of the above-mentioned conventional applications.

It is a feature and advantage of the present invention to provide a multi-media system and method that provides easy universal text searching for a non-technical user.

It is another feature and advantage of the present invention to provide a multi-media system and method that provides simultaneous and independent delivery/transmission of multi-media content via a single source to multiple different destinations.

It is yet another feature and advantage of the present invention to provide a multi-media system and method that provides easy access and manipulation of multi-media content from a multi-media library.

It is another feature and advantage of the present invention to provide a multi-media system and method that is compatible with existing control systems.

It is another feature and advantage of the present invention to provide a multi-media system and method that is configurable for connectivity with one or more electronic devices.

It is another feature and advantage of the present invention to provide a multi-media system and method that is controllable by a variety of electronic devices.

It is another feature and advantage of the present invention to provide a multi-media system and method that allows instantaneous multi-media selection.

It is another feature and advantage of the present invention to provide a multi-media system and method that enhances user enjoyment without impairment of audio/video quality.

It is another feature and advantage of the present invention to provide a multi-media system and method that allows quick and easy access/manipulation of media selections from both CDs and DVDs.

It is another feature and advantage of the present invention to provide a multi-media system and method that allows independent simultaneous access by each user to the entire multi-media library, whether accessed locally or via remote.

It is another feature and advantage of the present invention to provide a multi-media system and method that offers simplified management of multi-media libraries.

It is another feature and advantage of the present invention to provide a multi-media system and method that allows easy retrieval of multi-media selections for playback.

It is another feature and advantage of the present invention to provide a multi-media system and method having a capability to create customized play lists.

The above features and advantages are generally accomplished, in part, in the present invention by integrating a computing system configured with specialized software or program procedures, with one or more audio and/or video distributors. It is to be understood that the written description may be presented in terms of program procedures executed on a computer, computing system or network of computers. These procedural descriptions and representations are meant to convey the substance of the inventors' work to those skilled in the art.

A procedure is generally conceived to be a self-consistent sequence of steps leading to a desired result. Involved in those steps are physical manipulations of physical quantities generally in the form of electrical or magnetic signals capable of being stored, transferred, combined, compared and otherwise manipulated. The manipulations performed, such as adding or comparing or matching, are commonly associated with mental operations performed by a human operator. No such capability of a human operator is necessary or desirable in most cases in any of the operations forming a part of the present invention; the operations are machine operations.

The present invention also relates to apparatus for performing these operations, where such apparatus may be specially constructed for the required purpose. This apparatus may also comprise a general purpose computer as selectively reconfigured by a computer program or program procedures stored therein. The procedures presented herein are not inherently related to a particular computer or other apparatus. Various general purpose machines may be used with programs written in accordance with the teachings herein, or it may prove more convenient to construct more specialized apparatus to perform the required method steps.

In accordance with one embodiment of the present invention, a music server is provided. The music server comprises a computing system configured with a Linux operating system, a SQL database, a central controller or control program, and a user interface program. The computing system is configured for connectivity with one or more audio distributors via a universal serial bus.

The control program is in communication with the user interface, the database, library and all periphery devices. Accordingly, it receives commands from the user interface program, other personal computers, touch-panel control systems, personal digital assistants or any other electronic device capable of two-way communications.

Through the control program, the multimedia system of the present invention executes commands and transmits multiple, independent audio streams over the bus to each audio distributor as a single stream. The audio distributor is configured to split the single inbound stream into one, two or more streams of audio data, depending on the number of audio modules in the audio distributor. By connecting the audio outputs of the audio distributor to a multi-room stereo system, for instance, each of the two or more independent streams of audio data may be directed simultaneously to two or more different destinations.

In addition, the control program is configured to receive and process high-level search commands and return all matching records from the SQL database based on a universal text search.

The user interface program allows the user to interact with the control program without having to learn any special commands. Types of user interfaces may include menu-driven or graphical user interfaces. The user interface is divided into three main sections or functionalities: Search and Play, Record, and System Information.

The Search and Play functionality provides music search and playback facilities, as well as custom play-list creation and management, and music database management functionality. The Record functionality provides access to a CD-RW drive, for adding music to the database collection as desired. The System Information functionality provides status overview information on the system's operation as well as various trouble-shooting tools.

In accordance with another embodiment of the present invention, a multimedia server is provided. The term multimedia is generally referred to mean the combination of sound, graphics, animation and video. The multimedia server comprises a computing system configured with a Linux operating system, a SQL database, a central control program and a user interface program. In this case, however, the control program is configured to handle video as well as audio data streams. Accordingly, the computing system is configured for connectivity with one or more audio distributors via a universal serial bus and one or more video distributors via an Ethernet network.

Each video distributor may be configured as a computing system with a high speed network interface module, a video controller and one or more streaming audio/video decoders. As with the music server, the multimedia server of this embodiment, through the video distributor, splits a single stream of video data into two or more independent video streams, which may be directed simultaneously any number of video display devices in different locations.

There has thus been outlined, rather broadly, the important features of the present invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the present invention in detail, it is to be understood that the invention is not limited in its application to the details of construction and to the arrangements of the components set forth in the following description of illustrated in the drawings only. The invention herein described is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be used as a basis for designing of other structures, methods and systems for carrying out the several purposes of the present invention. It is important, therefore, that the claims be regarded as including such equivalent constructions insofar as they do not depart from the spirit and scope of the present invention.

Accordingly, the above features and advantages of the invention, together with other apparent features and advantages of the invention, along with the various features of novelty that characterize the invention, are pointed out with particularity in the claims annexed thereto and forming a part of this disclosure. For a greater understanding of the invention, its operation and the specific features and advantages attained by its uses, reference should be had to the accompanying drawings and description, which illustrates preferred embodiments of the invention.

BRIEF DESCRIPTION OF PREFERRED EMBODIMENTS

FIG. 1 illustrates a block diagram of the multi-media system of the present invention, in accordance with a preferred embodiment.

FIGS. 2A, 2B and 2C shows an exemplary embodiment of a SQL database table structure of the present invention.

FIGS. 3A, 3B, 3C and 3D is an exemplary screen shot each showing the Search functionality of the multi-media system of the present invention.

DETAILED DESCRIPTION OF PREFERRED EMBODIMENTS

Figure 4A:
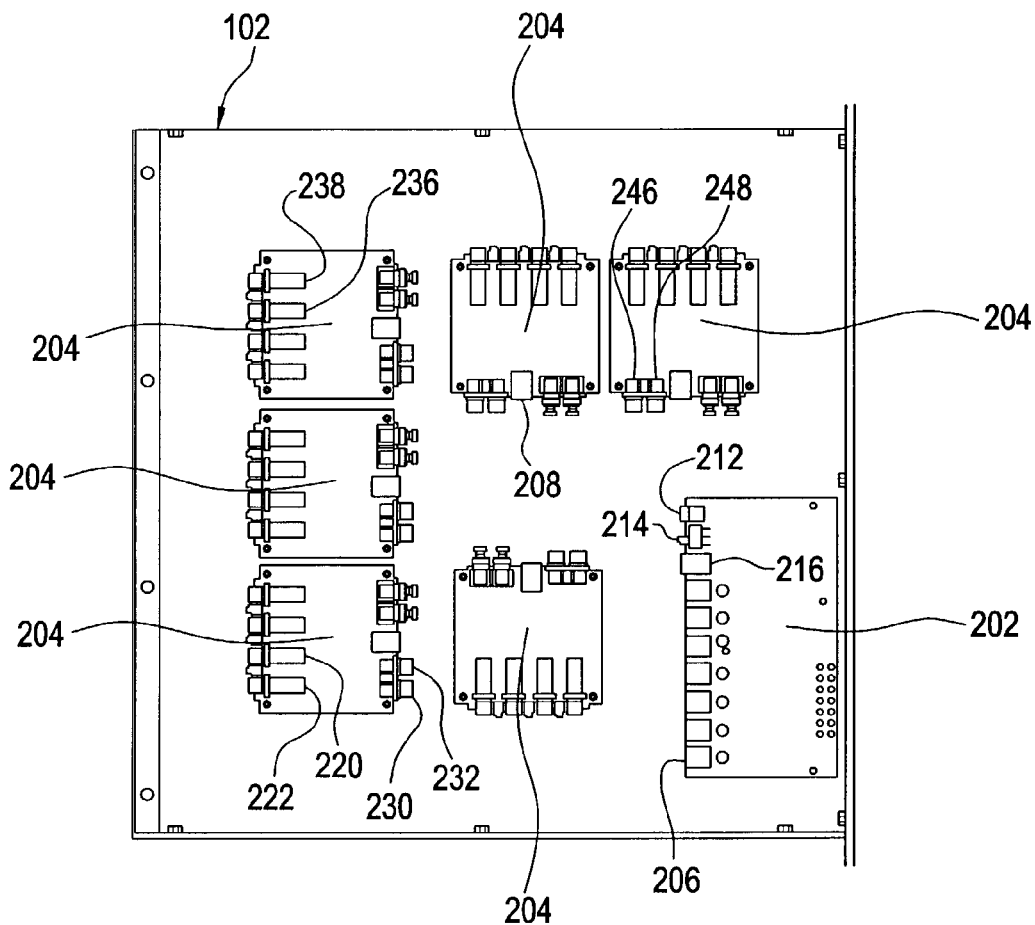
FIG. 4A shows a top view of an exemplary audio distributor for use with the multi-media system of the present invention.

Referring to FIG. 1, wherein the same reference numbers refer to the same parts throughout the various figures, there is shown a block diagram of an exemplary embodiment of the multi-media system of the present invention.

Viewed externally, the multimedia system 100 generally comprises a computing system 100, one or more audio distributors 102, zero or more video distributors 104 and at least one input/output device or mechanism. The input/output device may take the form of a keyboard 106, mouse 108, monitor 110, another computing system 112, a touch panel control system 114, a personal digital assistant 116, or any electronic device 118 capable of two way communications.

In a preferred embodiment, the multimedia system 100 is configured with a Linux operating system, such as Red Hat 7.2, and capable of multi-tasking and multi-threading. Viewed internally, the system 100 includes a database 120, multimedia library 122, control program 124, and user interface 126. The SQL database 120, such as MySQL 3.23, is configured to store information to the multimedia library 122. The library 122 preferably comprises of hard disk space from one or more drives, formatted to accept records, files and folders containing multimedia content.

In the case of multiple hard drives, each drive is preferably configured as a member of level 0 RAID, which creates a singular logical drive. With this configuration, the control program 124 accesses the logical drive as if the multimedia library 122 constituted a single (large) physical drive. Additionally, each disk space in the library 122 is preferably formatted using an 'ext3' file system, which provides excellent crash recovery in the event of power loss.

The multimedia library's file system is preferably divided into two folders: audio and non-audio, such as digital versatile disc (DVD). The audio folder is used to store audio content where each record or file contains one or more pieces of information about a musical selection or collection of musical selections on a compact disc, for instance. The DVD folder is divided into subfolders so that each movie or disc preferably has its own folder. Each folder name corresponds to the value of a dvdId field stored in a DVD table, as later discussed.

As depicted in FIG. 1, the third component of the multimedia system 100 comprises a control program 124. The control program 124 is configurable for communication with the SQL database 120 and the multimedia library 122, through a variety of software or hardware interfaces, to provide access to the database 120 and library 122. The control program 124 implements a number of commands usable to search the SQL database 120, to retrieve a multimedia selection and control its delivery. Preferably, the program 124 receives commands via an RS232 port, an Ethernet port, other I/O ports available on the computer, or via software sockets. This allows the multimedia system 100 of the present invention to be controllable by essentially any electronic device 118 with a compatible input/output port.

The control program 124 executes a command and responds with a success or error code to a command initiator via the same route by which the command was received. In addition, when data is requested from the database 120, as in the case of a search command, the results of the search are transmitted to the requestor via the same path by which the command was received. When the command requests retrieval of a multimedia selection, the control program 124 launches a detached thread which reads the appropriate multimedia content from the library 122, decodes it as necessary and delivers it to the proper audio and/or video distributor(s) 102, 104, respectively.

The control program 124 is also capable of executing a variety of commands that query the multimedia system 100 as to its operating status. The status information returned by the control program 124 preferably includes, for example, the total amount of space available in the multimedia library 122, the amount of hard drive space used, the amount of space available for additional music titles, the number of titles stored in the database 120, the internal system's temperature, the CPU temperature and the speed of the cooling fan. As with all other commands, the results are returned via the path received.

The fourth component of the multimedia system 100 is a user interface program 126 that is controllable using an input/output device, such as the keyboard 106 or mouse 108. The user interface program 126 communicates with the control program 124 via a software socket to allow the user to interact with the control program 124 using simple keystrokes and mouse clicks.

Referring now to FIGS. 2A, 2B and 2C, there is shown an exemplary embodiment of a SQL database 120 table structure. The database 120 is preferably configured with three tables that allows for the storage of information about the multimedia library 122.

The first of the three tables is a Music Titles Table 130, as shown in FIG. 2A. The Music Titles Table 130 contains one or more pieces of pertinent information relating to a collection of musical selections, which, for purposes of this discussion, is stored on a disc, that is present in the multimedia library 122. The pertinent information is referred to as a record, and preferably contains four pieces of information: a cdId field 132, which uniquely identifies the location of audio content of a CD in the library 122; the title 134 of the CD; the CD recording artist's name 136; and the genre 138 of the music.

The second table is the Track Information Table 140, as shown in FIG. 2B. The Track Information Table 140 contains one or more pieces of pertinent information relating to one song or musical selection, which may be stored on a disc as a track, that is present in the library 122. The pertinent information is referred to as a record and the Track Information Table 140 stores one record per song or, alternatively stores one record per CD track.

Each record in the Track Information Table 140 preferably contains five pieces of pertinent information stored in the database 120: the cdId field 132, as previously discussed; a track number 142; the name 144 of the track; the length 146 of the track, preferably in minutes and seconds; and the format 148 (e.g., MP3, Wave, etc.) in which the audio content of that track is stored in the library 122. The value of the cdId field 132 in combination with the track number 142 are used to pinpoint the location of a specific track in the multimedia library 122. For example, the record or file 1.2.wav contains music from the second track of compact disc number 1 in Wave format. Note that the internal format of the music is added to the file name as an extension.

The third and final table in the database 120 table structure is a DVD Movie Table 150, which stores one record per DVD movie or disc in the multimedia library 122. Each record stores one or more pieces of pertinent information, such as the movie title 154 and one or more user-supplied keywords 156 that may be used to locate a desired movie. The keyword(s) 156 may comprise any combination of words descriptive of the movie's genre, actor/actress name (s), director name(s), year produced, and the like. As with the Music Titles Table 130, a dvdId field 152 is also used to locate a particular movie inside the multimedia library 122.

Referring now to FIG. 3, there is shown a series of exemplary screen shots helpful in aiding a greater understanding of the search functionality of the user interface program 126 of the multimedia system 100 of the present invention.

Generally, the user interface program 126 functionality is divided into three sections: Search and Play, Record, and System Information. In a preferred embodiment, each section is represented by a tabbed button on a computer screen for easy selection. Generally, the Search and Play feature allows a user to type a search string, in response to which the user interface program 126 displays all matching multimedia selections that are available in the library 122.

More specifically, and referring to FIGS. 3A, 3B, 3C and 3D, there is shown a screen shot representation of a universal text searching methodology, in accordance with one aspect of the present invention. In this instance, the present invention may be implemented in a university music school department where the information stored in the multimedia library 122 includes various types of music.

As depicted in FIG. 3A, the search screen 160 is divided into two major areas: a search string entry area 162 and search results area 164. The search string entry area 162 is used to enter one or more keywords comprising a search string, which is searchable in one or more fields in the SQL database 120. The search results area 164 comprises eleven lines of musical selections, numbered 1 through 11, and is divided into seven columns, discussed in more detail below. Each column contains a single piece of information describing an aspect of a musical selection present in the university's multimedia library 122.

For example, the first four columns provide status feedback information to a user as to which area of the database 120 was found to contain a match in the search string entry area 162. A check in each of the Title Status Column 166, Song Status Column 168, Artist Status Column 170 or Genre Status Column 172 indicates the search string was found in these corresponding areas of the database 120. For example, a check in the Title Status Column 166 indicates that the search string is present in the database's title 134 file shown in FIG. 2A.

The remaining three columns of the screen 160 do not provide status information; they provide specific information. For instance, the Artist Column 174 provides information on the recording artist's name. The Title Column 176 provides the title of the recording, such as a CD title or a movie title. The Genre Column 178 provides a brief description of the general classification of the music or movie, such as Classical, Rock, Jazz, Drama, Sci-Fi, and the like.

The features and advantages of the universal text searching capability is more fully understood with reference to FIGS. 3B, 3C and 3D. In the search screen 180 shown in FIG. 3B, a user, such as a university student, seeking to locate musical selections by the Beatles, enters the letter 'b' in search string entry area 162. In response, the multimedia system 100 substantially immediately updates the contents of musical selections 1 through 11, shown in FIG. 3A, with a new combination of musical selections 9 through 19. Observe in FIG. 3B that musical selections 1 through 8 were deleted, that selections 9 through 11 remained and that new selections 12 through 19 are provided by way of update of additional titles and/or songs and/or artist and/or genre information containing the letter 'b'.

Referring now to search screen 190 in FIG. 3C, the student modifies the earlier search inquiry by adding the letter 'e', forming a new search string 'be' in the search string entry area 162. Again, in response, the multimedia system 100 of the present invention updates the search results area 164 by removing all musical selections that do not contain the 'be' search string and adding additional musical selections that matches the search string 'be'. Accordingly, prior musical selections 9 through 13, and selection 1 are now displayed, in addition to new musical selections 20 through 24.

Finally, in search screen 200 in FIG. 3D, the user adds the letter 'a' to the earlier search string, forming the new search string 'bea'. As before, the search results area 164 is updated to reflect a different combination of previous and new musical selections 9, 10, 20, 21, 22 and 25 through 30.

The advantages of quick determination and easy selection provided by the status feedback columns 166, 168, 170, 172 can be seen in search screen 200 in FIG. 3D. The search string, 'bea', entered by the user was found in the CD's title and its artist's name for musical selection 22. Consequently, a check mark appears in the Title Status Column 166 and the Artist Status Column 170 for musical selection 22, but not in the Song Status Column 169 or Genre Status Column 172.

Similarly, when comparing both musical selections 21, 22 by the artist The Beatles, since the artist's name contains the string, 'bea', in both selections 21, 22, in both instances the Artist Status Column 170 is checked. However, the CD title for musical selection 22 also contains the string 'bea', while the CD title for musical selection 21 does not. Therefore, the Title Status Column 166 is checked for musical selection 22, but not for musical selection 21.

The advantages of quick determination and easy selection is accomplished by a sorting program developed by the inventors. In accordance with one embodiment of the present invention, the multimedia system 100 sorts musical selection titles based substantially on a one-to-one match of a character entered at the beginning of the search string area with the first character in the artist's name, and other characters entered sequentially thereafter.

As a further illustration of the sorting program, reference is made to FIG. 3D. For example, although musical selections 9, 21, 22 all represent CDs by The Beatles, the musical selection 10 by Beau Jocque and musical selection 20 by Joe Beard are displayed in between selections 9 and 21 by The Beatles. The reason for that is because the search string 'bea' is located at the very beginning of the Artist's Column 174 for selection 9. Consequently, it is moved to the top of the sort order.

While in selection 10, Beau Jocque also contains the 'bea' search string at the very beginning of its Artist's Column 174, because 'Beau' is alphabetically after 'Beatles', selection 10 is the second entry in FIG. 3D.

Logically, the sort program of the multimedia system 100 of the present invention, performs a sequencing function that generally begins with locating all titles of recordings that contain a keyword search or search string in any location in any of the database fields. Each title is then assigned a priority value based on which column 166, 168, 170, 172, 174, 176, 178 the search entry was found in.

For example, if a keyword search entry was found in the Artist Column 174, that musical selection title match is assigned a priority value of 1000. If the search entry was found in the Title Column 176, that musical selection title match is assigned a priority value of 2000. Similarly, a match found in the Genre Column 178 and Song Column 168, are assigned priority values of 3000 and 4000, respectively.

Next, each title is assigned a priority value based on the location within each column 166, 168, 170, 172, 174, 176, 178 where the search entry was found. Thus, in FIG. 3D for example, musical selections 9, 10 are assigned a priority value of 1001 while selections 20, 21, 22 all have priority values of 1004. The titles are then sorted by their priority values in ascending order. Titles having substantially the same priority number are sorted alphabetically by the Artist Column 174 field and then by the Title Column 176 field.

It is important to note that the Search and Play functionality of the user interface program 126 provides playback and transport control, so that once the desired selection is located, a user simply clicks the Play button to listen or view the desired selection. The transport control buttons offer the functionality of the comparable Stop, Pause, Next Track and Previous Track found on a CD or DVD player.

Finally, the Search and Play section of the user interface program 126 allows a user to create customized play-lists of any musical selection or movies present in the library 122. Once created, a play-list may be viewed and/or listened as desired.

As to the Record section, the second section of the user interface program 126, it allows a user to add one or more selections to the library 122. In a preferred embodiment, upon selecting the Record section, a user is prompted to insert a CD or DVD of choice into a computer's drive. When possible, the contents of the disc are automatically detected by the multimedia system 100 using the Freedb database, which is a free CD identification service available over the Internet.

In instances when the user interface program 126 cannot identify the inserted multimedia medium, the user is prompted to fill-in the fields required in order to properly catalog the disc. The user interface program 126 then proceeds to transfer audio and/or video content into the multimedia library 122. When completed, the SQL database 120 is updated to reflect the new selection.

The System Information section, which is the third and final section of the user interface program 126, queries the control program 124 for various system statistics, such as total disc space, amount of space used, number of titles in the library 122, and the like. The returned information is then presented to the user in a well-organized manner.

Figure 4B:
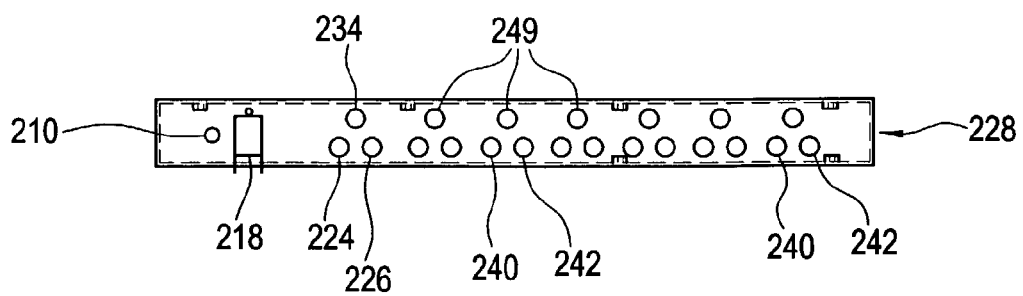
FIG. 4B shows a back view of the audio distributor of FIG. 4A.

Referring now to FIGS. 4A and 4B, there is shown top and rear views, respectively, of an exemplary audio distributor 102 usable with the multimedia system 100 of the present invention. The audio distributor 102 preferably comprises a universal serial bus (USB) hub 202 and up to six audio modules 204.

The USB hub 202 allows the audio distributor 102 to be connected to a variety of peripherals, such as external CD-ROM drives, printers, modems, mice and keyboards, through a single, general-purpose port. The USB hub 202 is also designed to support the ability to automatically add and configure new devices, and the ability to add such devices, to the audio distributor 102 without having to shut down and restart the multimedia system 100.

In a preferred embodiment, the USB hub 202 connectivity to each audio module 204 employs a standard USB cable connected to one of the seven USB connectors 206 on the USB hub 202 to a USB connector 208 on the audio module 204. An external power jack 210 (FIG. 4B) is connected to the USB hub's power jack 212. A power switch 214 is preferably in an 'on' position at all times. A USB B-type connector 216 on the USB hub 202 is connected to a USB B-type connector 218 on the rear panel.

Left and right analog audio inputs 220, 222 are connected to corresponding analog audio inputs 224, 226 on the audio distributor's rear panel 228 shown in FIG. 4B. The digital audio input 246 is connected to the digital audio input 234 on the rear panel 228 shown in FIG. 4B.

In a similar fashion, the left and right analog audio outputs 236, 238 from each audio module 204 are connected to the audio distributor's rear panel's analog audio outputs 240, 242. The digital audio output 248 from each audio module 204 is connected to the rear panel's 228 digital audio output 249. All audio connections are preferably made using standard audio cables and connectors.

Alternatively and optionally, one or more audio distributors 102 may be connected to the multimedia system 100 using such USB cables and hubs 202. The rear view of the audio distributor 102 in FIG. 4B shows, in addition to the USB B-type connector 218, one digital audio input 234, a pair of analog audio inputs 224, 226, six digital audio outputs 249, and six pairs of analog audio outputs 240, 242 mounted thereon.

The operating system of the multimedia system 100 is configured with the proper device files for each audio module 204 present in order to provide the control program 124 with access to each audio module 204 individually. More specifically, device files are created in a '/dev' folder for each audio module 204 with appropriate major and minor numbers using a 'mknod' command, for instance. These device files are used by the control program 124 to assist in identifying the final destination of an audio stream. By connecting the audio outputs of the audio distributor 102 to a university's multi-room stereo system, the university may direct music from any output to any desired room or desk area for individual use by students.

In a preferred embodiment, the Linux operating system addresses devices by using a major and minor number scheme. The major number identifies the type of device while the minor number identifies the specific physical device.

For example, the major number designated for audio devices is 14, and the minor numbers designated for physical devices start at 3 with an increment of 16. In this instance, the first audio module 204 may be addressed as "14,3", where a second audio module 204 is addressed as "14,19", and the like.

Figure 5A:
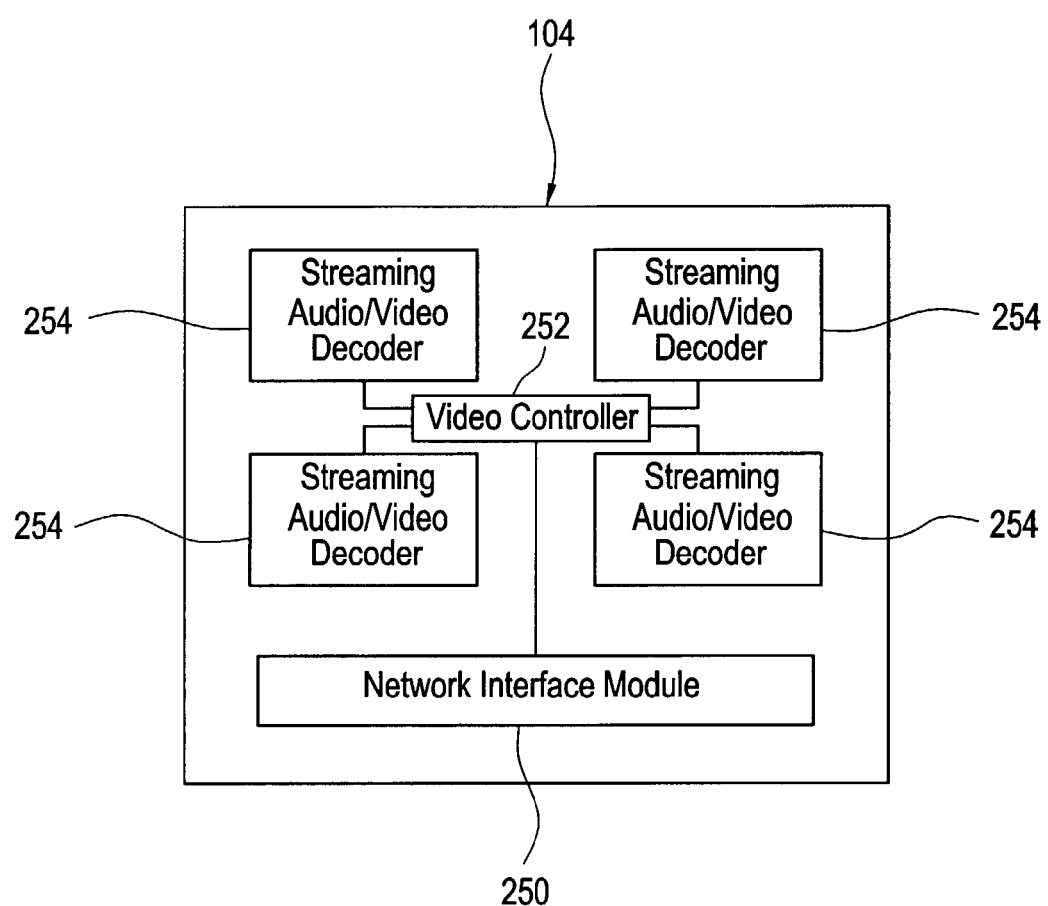
FIG. 5A illustrates a block diagram of an exemplary video distributor for use with the multimedia system of the present invention.

Referring now to FIG. 5A, there is shown a block diagram of an exemplary video distributor 104 for use with the multimedia system 100 of the present invention. Viewed internally, the video distributor 104 may be configured as a computing system equipped with a fast Ethernet network interface module 250, a multi-headed video card or video controller 252, and one or more audio/video decoders 254. The video controller 252 comprises software components that receive a single composite stream of data, split it into one or more individual streams, and route each stream to a designated streaming audio/video decoder 254. Each decoder 254 transmits the decoded video stream to a video graphics adapter 253 (FIG. 5B), which then sends the decoded video stream on to a video display. As depicted in FIG. 1, one or more video distributors 104 may be connected to the system 100 using standard fast Ethernet hubs and cables.

Preferably, the video distributor 104 is loaded with a Linux operating system and a standardized set of display-handling routines, such as an X-Windows system. The X-Windows system is configured to use a separate physical display device for generating a display of text or graphics output provided by an appropriate hardware component, such as a multi-headed video graphics adapter 253.

In one embodiment, a Matrox G200MMS card may be used with four outputs where the X-Windows system is configured to perform four separate and independent sessions, with each session using a unique output on the card.

The video controller 252 awaits commands and video streams from the control program 124. As soon as the control program 124 initiates a video stream, the video controller 252 launches a detached thread, which receives the streaming coded video data, decodes it via the decoder 254, and transmits the data to the appropriate X-Windows session.

Figure 5B:
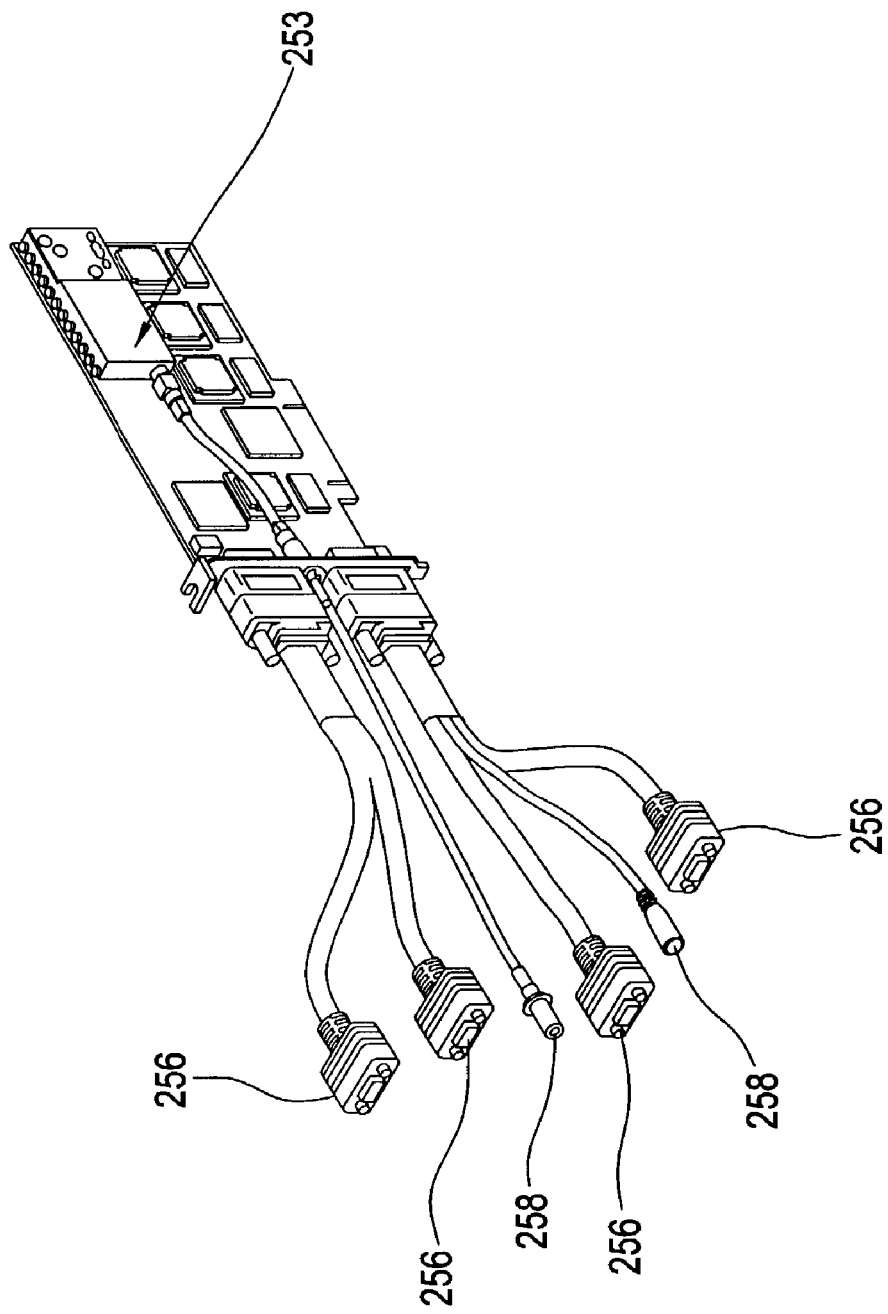
FIG. 5B illustrates one embodiment of a video distributor board and connections.

As depicted in the embodiment of the video distributor shown in FIG. 5B, the multi-headed video graphics adapter 253 is capable of emulating up to four video graphics adapter (VGA) boards in a single board, and may be connected to one or more analog display device using VGA-type connectors 256. Additionally, the video graphics adapter 253 may also be connected to one or more digital display devices using digital connectors 258.

In order to synchronize audio with the video stream, the multimedia system 100 preferably employs an audio distributor 102 in conjunction with a video distributor 104. With this connectivity through the multimedia system 100, when a student requests a movie from the university's multimedia library 122 to be played via a particular video output, for example, the audio stream for that movie is transmitted to the proper audio module 204 corresponding to the particular video output.

The many features and advantages of the present invention are apparent from the detailed specification. Thus, it is intended by the appended claims to cover all such features and advantages of the invention that fall within the true spirit and scope of the invention.

Further, since numerous modifications and variations will readily occur to those skilled in the art, it is not desired to limit the invention to the exact construction and operation illustrated and described. Accordingly, all suitable modifications and equivalents fall within the scope of the invention.

What is claimed is:

1. A multimedia system, comprising:
   a plurality of output destinations;
   a data port configured to receive a composite multimedia digital stream of data, wherein the composite multimedia digital stream of data represents a plurality of individual multimedia digital data streams; and
   a controller in communication with the data port and the plurality of output destinations, wherein the controller is configured to receive the composite multimedia digital stream of data from the data port, to split each of the plurality of individual multimedia digital data streams into an independent and individual multimedia digital stream of data, and to simultaneously route each independent and individual multimedia digital stream of data to a different one of the plurality of output destinations.

2. The multimedia system of claim 1, wherein at least one of the plurality of individual multimedia digital data streams comprises video digital data.

3. The multimedia system of claim 1, wherein at least one of the plurality of individual multimedia digital data streams comprises audio digital data.

4. The multimedia system of claim 1, wherein at least one of the plurality of output destinations comprises:
   a video display;
   a decoder configured to receive the individual multimedia digital stream of data and to decode the individual multimedia digital stream of data; and
   a video graphics adapter in communication with decoder and the video display, wherein the video graphics adapter is configured to receive the decoded stream of data and to display the decoded stream of data on the video display.

5. The multimedia system of claim 1, further comprising a means for converting the individual multimedia digital stream of data from digital to analog format.

6. The multimedia system of claim 1, wherein the data port comprises a universal serial port (USB).

7. The multimedia system of claim 1, wherein the data port comprises a Ethernet connection connected to a local area network.

8. The multimedia system of claim 1, wherein at least one of the output destinations is specified by a user using a touch panel.

9. A method for delivering multimedia data in a multimedia system, the multimedia system having a plurality of output destinations, a data port configured to receive a composite multimedia digital stream of data, and a controller in communication with the data port and the plurality of output destinations, the method comprising:
   receiving the composite multimedia digital stream of data, wherein the composite multimedia digital stream of data represents a plurality of individual multimedia digital data streams;
   splitting each of the plurality of individual multimedia digital data streams into an independent and individual multimedia digital stream of data; and
   simultaneously routing each independent and individual multimedia digital stream of data to a different one of the plurality of output destinations.

10. The method of claim 9, wherein at least one of the plurality of individual multimedia digital data streams comprises video digital data.

11. The method of claim 9, wherein at least one of the plurality of individual multimedia digital data streams comprises audio digital data.

12. The method of claim 9, wherein the data port comprises a universal serial port (USB).

13. The method of claim 9, wherein the data port comprises a Ethernet connection connected to a local area network.

* * * * *